US012734702B2

(12) United States Patent
Ishii et al.

(10) Patent No.: US 12,734,702 B2
(45) Date of Patent: Sep. 15, 2026

(54) CONTROL DEVICE AND CONTROL METHOD OF ROBOT, ROBOT SYSTEM, AND DEVICE AND METHOD OF GENERATING OPERATION PROGRAM OF ROBOT

(71) Applicant: FANUC CORPORATION, Yamanashi (JP)

(72) Inventors: Yuki Ishii, Yamanashi (JP); Yihua Gu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 9 days.

(21) Appl. No.: 18/928,193

(22) Filed: Oct. 28, 2024

(65) Prior Publication Data

US 2025/0050504 A1 Feb. 13, 2025

Related U.S. Application Data

(62) Division of application No. 17/996,078, filed as application No. PCT/JP2021/015082 on Apr. 9, 2021, now Pat. No. 12,420,425.

(30) Foreign Application Priority Data

Apr. 15, 2020 (JP) ................................ 2020-073038

(51) Int. Cl.
*B25J 9/16* (2006.01)
*B25J 13/08* (2006.01)

(52) U.S. Cl.
CPC .......... *B25J 9/1697* (2013.01); *B25J 9/1633* (2013.01); *B25J 13/085* (2013.01)

(58) Field of Classification Search
CPC ... B25J 13/00; B25J 13/085; B25J 9/16; B25J 9/1633; B25J 9/1697; G05B 2219/37208; G05B 2219/40584; G05B 2219/40586
USPC .................................................. 700/245–264
See application file for complete search history.

(56) References Cited

U.S. PATENT DOCUMENTS

| | | | | |
|---|---|---|---|---|
| 5,761,390 | A * | 6/1998 | Koshishiba | G05B 19/402 901/41 |
| 9,186,795 | B1 * | 11/2015 | Edsinger | B25J 11/0065 |
| 9,346,164 | B1 * | 5/2016 | Edsinger | B25J 9/1694 |
| 9,694,495 | B1 * | 7/2017 | Edsinger | B25J 9/1656 |
| 10,540,779 | B2 * | 1/2020 | Shih | G06T 7/70 |

(Continued)

FOREIGN PATENT DOCUMENTS

| | | |
|---|---|---|
| DE | 102012021374 B4 | 2/2016 |
| DE | 102017128757 A1 | 6/2018 |

(Continued)

*Primary Examiner* — Jonathan L Sample
(74) *Attorney, Agent, or Firm* — HAUPTMAN HAM, LLP

(57) ABSTRACT

A control device of a robot includes a robot control section configured to control the robot so as to sequentially position the robot at a plurality of target positions, which are set based on shape data representing a shape of a workpiece, and cause the robot to execute a work along a work target portion on the workpiece, and cause the robot to continue the work beyond a final target position of the plurality of target positions after the robot reaches the final target position, the final target position being set to correspond to an end of the work target portion in the shape data.

4 Claims, 12 Drawing Sheets

(56) References Cited

U.S. PATENT DOCUMENTS

| | | | | |
|---|---|---|---|---|
| 2005/0211029 | A1* | 9/2005 | Zurecki | B23Q 11/1061 239/128 |
| 2009/0003975 | A1* | 1/2009 | Kuduvalli | B25J 9/0084 901/19 |
| 2014/0107569 | A1* | 4/2014 | Fischer | A61M 5/3287 604/95.01 |
| 2015/0005923 | A1* | 1/2015 | Gu | B24B 27/0038 901/41 |
| 2015/0314442 | A1* | 11/2015 | Boca | B25J 9/1697 700/259 |
| 2016/0236414 | A1* | 8/2016 | Reese | B33Y 50/02 |
| 2017/0129023 | A1* | 5/2017 | Su | B25J 11/006 |
| 2020/0282558 | A1* | 9/2020 | Kim | B25J 9/1607 |
| 2021/0362334 | A1* | 11/2021 | Yamane | G05B 19/4155 |
| 2023/0191613 | A1* | 6/2023 | Ishii | B25J 9/1697 700/259 |

FOREIGN PATENT DOCUMENTS

| | | | |
|---|---|---|---|
| DE | 102018004522 | A1 | 12/2018 |
| DE | 102018116245 | A1 | 1/2019 |
| DE | 112017007302 | T5 | 1/2020 |
| JP | H06-262562 | A | 9/1994 |
| JP | H09-179632 | A | 7/1997 |
| JP | 2006-058961 | A | 3/2006 |
| JP | 2015-009324 | A | 1/2015 |
| JP | 2017-091269 | A | 5/2017 |

* cited by examiner $W_R$ $\delta$ $E_R$ $F_I$ $E_I$ $F_R$

W

δ

$E_R$ $TP_{m-2}$ $TP_{m-1}$ $F_I$ $TP_m$, $E_I$ $F_R$

CONTROL DEVICE AND CONTROL METHOD OF ROBOT, ROBOT SYSTEM, AND DEVICE AND METHOD OF GENERATING OPERATION PROGRAM OF ROBOT

RELATED APPLICATIONS

The present application is a divisional of U.S. patent application Ser. No. 17/996,078, filed Oct. 13, 2022, which is a National Phase of International Application No. PCT/JP2021/015082 filed Apr. 9, 2021, which claims priority to Japanese Application No. 2020-073038, filed Apr. 15, 2020, the disclosures of which are hereby incorporated by reference herein in their entireties.

TECHNICAL FIELD

The present invention relates to a control device and a control method of a robot, a robot system, and a device and a method of generating an operation program of a robot.

BACKGROUND ART

There is known a control device (e.g., PTL 1) that sequentially positions a robot at a plurality of target positions and causes the robot to execute a predetermined work (e.g., deburring).

CITATION LIST

Patent Literature

PTL 1: JP 2017-91269

SUMMARY OF INVENTION

Technical Problem

In the related art, the target position of the robot may misalign from an actual workpiece, and a work may not be completed up to an end of a work target portion on the workpiece.

Solution to Problem

In an aspect of the present disclosure, a control device of a robot includes a robot control section configured to control the robot so as to: sequentially position the robot at a plurality of target positions, which are set based on shape data representing a shape of a workpiece, and cause the robot to execute a work along a work target portion on the workpiece; and cause the robot to continue the work beyond a final target position of the plurality of target positions after the robot reaches the final target position, the final target position being set to correspond to an end of the work target portion in the shape data.

In another aspect of the present disclosure, a device configured to generate an operation program of a robot includes a shape data acquisition section configured to acquire shape data representing a shape of a workpiece, a target position setting section configured to set a plurality of target positions at which the robot is to be sequentially positioned for a work onto a work target portion on the workpiece, based on the shape data, an additional target position setting section configured to automatically set an additional target position at a position separated from a final target position of the plurality of target positions by a predetermined distance in a predetermined extension direction, the final target position being set by the target position setting section so as to correspond to an end of the work target portion in the shape data, and a program generation section configured to generate the operation program in which the plurality of target positions and the additional target position are defined.

In further another aspect of the present disclosure, a control method of a robot includes controlling the robot so as to: sequentially position the robot at a plurality of target positions, which are set based on shape data representing a shape of a workpiece, to cause the robot to execute a work along a work target portion on the workpiece; and cause the robot to continue the work beyond a final target position of the plurality of target positions after the robot reaches the final target position, the final target position being set to correspond to an end of the work target portion in the shape data.

In still another aspect of the present disclosure, a method of generating an operation program of a robot includes acquiring shape data representing a shape of a workpiece, setting a plurality of target positions at which the robot is to be sequentially positioned for a work onto a work target portion on the workpiece, based on the shape data, automatically setting an additional target position at a position separated from a final target position of the plurality of target positions by a predetermined distance in a predetermined extension direction, the final target position being set to correspond to an end of the work target portion in the shape data, and generating the operation program in which the plurality of target positions and the additional target position are defined.

Effects of Invention

According to the present disclosure, it is possible to reliably complete a work up to an end of a work target portion, and to prevent a portion near the end from being unworked. This makes it possible to improve the finish quality of a workpiece.

DESCRIPTION OF EMBODIMENTS

Figure 1:
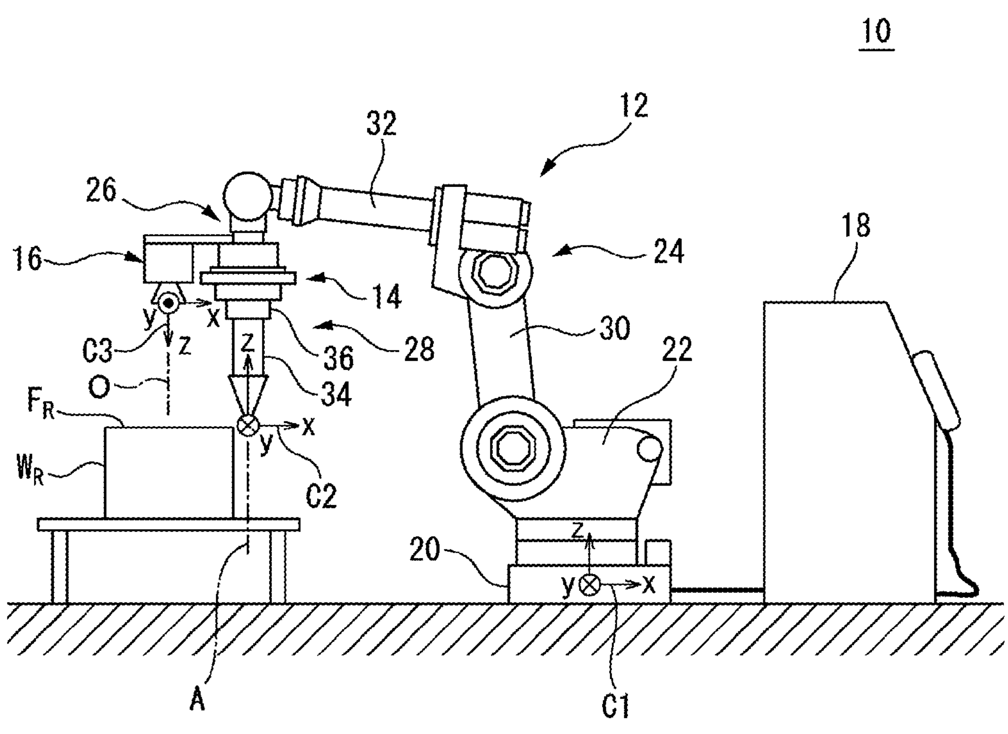
FIG. 1 is a diagram of a robot system according to an embodiment.

Hereinafter, embodiments of the present disclosure will be described in detail with reference to the drawings. Note that in various embodiments described below, the same elements are denoted by the same reference signs, and redundant description will be omitted. First, a robot system 10 according to an embodiment will be described with reference to FIG. 1 and FIG. 2. The robot system 10 includes a robot 12, a force sensor 14, a vision sensor 16, and a control device 18.

In the present embodiment, the robot 12 is a vertical articulated robot and includes a robot base 20, a swivel body 22, a robot arm 24, a wrist 26, and an end effector 28. The robot base 20 is fixed on the floor of a work cell. The swivel body 22 is provided on the robot base 20 to be able to swivel around a vertical axis. The robot arm 24 includes a lower arm 30 rotatable around a horizontal axis is provided on the swivel body 22, and an upper arm 32 rotatably provided on a tip of the lower arm 30. The wrist 26 is rotatably provided on a tip of the upper arm 32, and rotatably supports the end effector 28.

Figure 2:
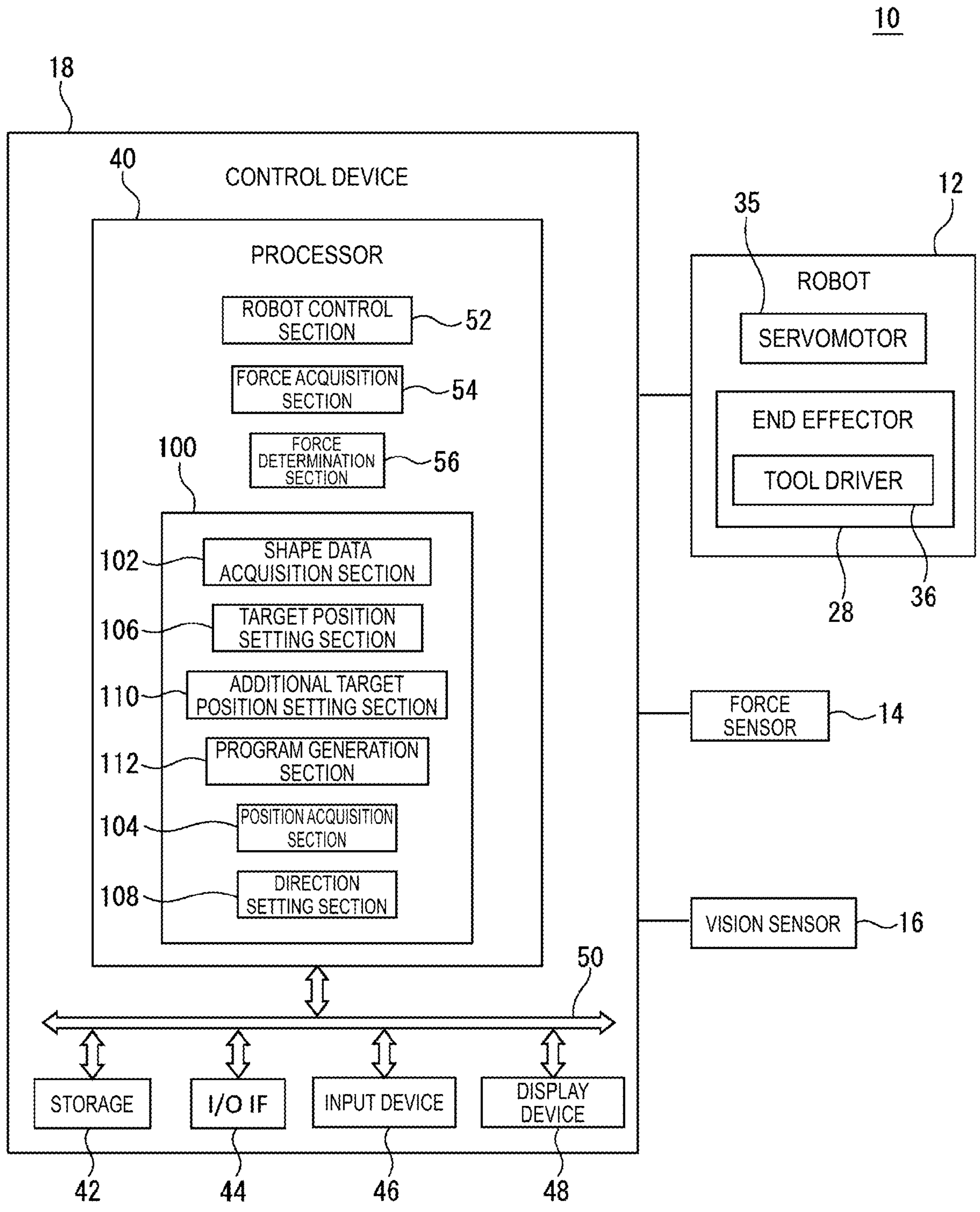
FIG. 2 is a block diagram of the robot system illustrated in FIG. 1.

Each of the robot base 20, the swivel body 22, the robot arm 24, and the wrist 26 includes a servomotor 35 inside (FIG. 2). The servomotor 35 drives each movable element (i.e., the swivel body 22, the robot arm 24, and the wrist 26) of the robot 12 according to a command from the control device 18. By the operation of these movable elements, the robot 12 moves the end effector 28.

In the present embodiment, the end effector 28 performs a work of scraping and removing burrs formed on a workpiece $W_R$ (so-called deburring). Specifically, the end effector 28 includes a tool 34 and a tool driver 36 that rotationally drives the tool 34 about an axis line A. The tool 34 is a deburring tool and scrapes the workpiece $W_R$ at the conical tip thereof. The tool driver 36 includes, for example, a servomotor and rotationally rotates the tool 34 according to a command from the control device 18.

A robot coordinate system C1 (FIG. 1) is set in the robot 12. The robot coordinate system C1 is a control coordinate system for automatically controlling an operation of each movable element of the robot 12, and is fixed in a three-dimensional space. In the present embodiment, the robot coordinate system C1 is set with respect to the robot 12 such that its origin is arranged at the center of the robot base 20 and its z-axis matches the swivel axis of the swivel body 22.

A tool coordinate system C2 is set for the tool 34. The tool coordinate system C2 is a control coordinate system for controlling the position and orientation of the tool 34 (i.e., the end effector 28) in the robot coordinate system C1. In the present embodiment, the tool coordinate system C2 is set with respect to the tool 34 such that its origin is arranged at a tip point of the tool 34 and its z-axis matches the axis line A.

When moving the tool 34, the control device 18 sets the tool coordinate system C2 in the robot coordinate system C1, and controls each servomotor 35 of the robot 12 such that the tool 34 is arranged at the position and the orientation represented by the set tool coordinate system C2. By so doing, the control device 18 can position the tool 34 at any position and orientation in the robot coordinate system C1.

The force sensor 14 detects a force F applied from the workpiece $W_R$ to the tool 34 during the work (i.e., deburring) on the robot 12. For example, the force sensor 14 is a 6-axis force sensor including a body having a cylindrical shape and a plurality of strain gauges provided on the body. In the present embodiment, the force sensor 14 is interposed between the wrist 26 and the end effector 28 (specifically, the tool driver 36).

The vision sensor 16 is, for example, a two-dimensional camera or a three-dimensional vision sensor, and includes an optical system (a collimator lens, a focus lens, etc.), an imaging sensor (CCD, CMOS, etc.), or the like. The vision sensor 16 images an object and transmits the imaged image data to the control device 18. The vision sensor 16 is fixed at a predetermined position with respect to the end effector 28.

A sensor coordinate system C3 is set in the vision sensor 16. The sensor coordinate system C3 defines coordinates of respective pixels of the image data imaged by the vision sensor 16. In the present embodiment, the sensor coordinate system C3 is set with respect to the vision sensor 16 such that its origin is arranged at the center of a light receiving surface of the imaging sensor of the vision sensor 16, its x-axis and y-axis are arranged in parallel to the lateral direction and the longitudinal direction of the imaging sensor, and its z-axis matches an optical axis O of the vision sensor 16.

The positional relationship between the sensor coordinate system C3 and the tool coordinate system C2 is known by calibration. Thus, the coordinates of the sensor coordinate system C3 of the image data imaged by the vision sensor 16 can be transformed into coordinates of the tool coordinate system C2 via a transformation matrix M1 obtained by calibration.

Furthermore, the coordinates of the tool coordinate system C2 can be transformed into coordinates of the robot coordinate system C1 via a known transformation matrix M2 defined according to the position and orientation of the tool coordinate system C2 in the robot coordinate system C1 (i.e., the coordinates of the origin and the direction of each axis). Thus, the coordinates of the sensor coordinate system C3 can be transformed into the coordinates of the robot coordinate system C1 via the transformation matrices M1 and M2. By so doing, the vision sensor 16 is arranged in a known positional relationship with the control coordinate system (the robot coordinate system C1, the tool coordinate system C2).

The control device 18 controls the operations of the robot 12, the force sensor 14, and the vision sensor 16. Specifically, the control device 18 is a computer including a processor 40, a storage 42, an I/O interface 44, an input device 46, and a display device 48. The processor 40 includes a CPU, a GPU, or the like, and is communicably connected to the storage 42, the I/O interface 44, the input device 46, and the display device 48 via a bus 50. The processor 40 performs arithmetic processing for implementing various functions to be described later while communicating with the storage 42, the I/O interface 44, the input device 46, and the display device 48.

The storage 42 includes a RAM, a ROM, or the like, and stores various types of data temporarily or permanently. The I/O interface 44 includes, for example, an Ethernet (trade name) port, a USB port, an optical fiber connector, an HFMI (trade name) terminal, or the like and communicates data to or from an external device through wireless or wired communication under a command from the processor 40. The servomotor 35, the tool driver 36, the force sensor 14, and the vision sensor 16 described above are communicably connected to the I/O interface 44 in a wireless or wired manner.

The input device 46 includes a keyboard, a mouse, a touch panel, or the like, receives an input operation of an operator, and transmits input information to the processor 40. The display device 48 includes an LCD, an organic EL display, or the like, and displays various types of information under a command from the processor 40.

Figure 3:
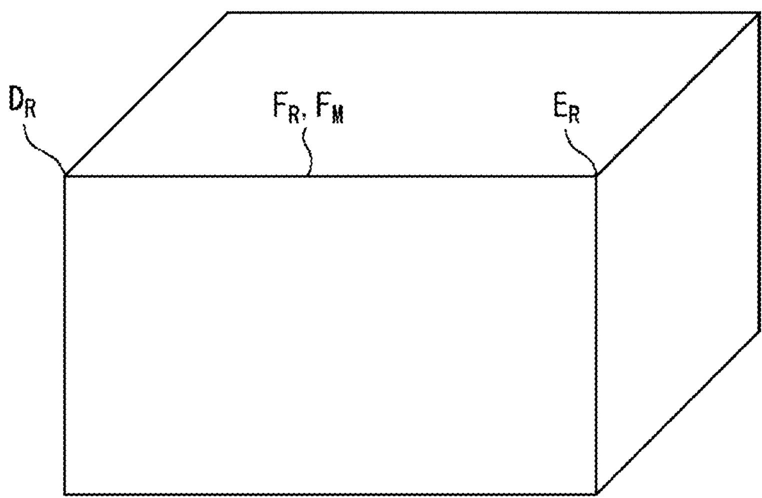
FIG. 3 is a diagram illustrating an example of a workpiece.
Figure 3:
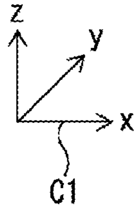

FIG. 3 illustrates an example of a workpiece $W_R$ which is a target of a work performed by the robot 12. In the present embodiment, it is assumed that deburring is performed on an edge $F_R$ extending from a vertex $D_R$ to a vertex $E_R$ of the workpiece $W_R$. The processor 40 operates the robot 12 in accordance with an operation program OP, and performs a work on the workpiece $W_R$. The operation program OP is stored in the storage 42 in advance.

Hereinafter, a method of generating the operation program OP in the robot system 10 will be described. First, the processor 40 acquires drawing data (e.g., 3D CAD data) DD of a workpiece model $W_M$ obtained by modeling the workpiece $W_R$. For example, the operator operates a drawing device (CAD device etc.), generates the drawing data DD of the workpiece model $W_M$, and supplies the drawing data DD from the drawing device to the control device 18.

The processor 40 acquires the drawing data DD via the I/O interface 44 and stores the drawing data DD in the storage 42. The drawing data DD corresponds to shape data representing the shape of the workpiece $W_R$. Consequently, the processor 40 serves as a shape data acquisition section 102 (FIG. 2) configured to acquire shape data.

Next, the processor 40 receives input information for designating a work target portion in the workpiece model $W_M$. Specifically, the processor 40 displays the workpiece model $W_M$ on the display device 48, and the operator operates the input device 46 while visually recognizing the workpiece model $W_M$ displayed on the display device 48, and inputs input information for designating an edge model $F_M$ obtained by modeling the edge $F_R$ as a work target portion in the workpiece model $W_M$. The processor 40 sets the edge model $F_M$ as a work target portion $F_M$ in the drawing data DD according to the input information from the operator.

Next, based on the work target portion $F_M$ set in the workpiece model $W_M$, the processor 40 acquires the position of the work target portion $F_M$ in the robot coordinate system C1. In the present embodiment, in the real space, the workpiece $W_R$ is positioned at a known installation position in the robot coordinate system C1 such that a work target portion (edge) $F_R$ on the workpiece $W_R$ extends parallel to the x-axis of the robot coordinate system C1. The processor 40 can acquire data (specifically, coordinates) of a position $P_{FM}$ of the work target portion $F_M$ in the robot coordinate system C1 from the installation position data and the workpiece model $W_M$ in the robot coordinate system C1.

Next, the processor 40 images the work target portion (i.e., edge) $F_R$ on the actual workpiece $W_R$ by operating the vision sensor 16. Specifically, the processor 40 operates the robot 12 based on the acquired position $P_{FM}$ of the robot coordinate system C1, and positions the vision sensor 16 at an imaging position where the work target portion $F_R$ can be included in the field of view.

Next, the processor 40 images the workpiece $W_R$ by operating the vision sensor 16. At this time, the work target portion $F_R$ is reflected as a work target portion image $ID_F$ in image data ID imaged by the vision sensor 16. The image data ID imaged by the vision sensor 16 corresponds to the shape data representing the shape of the workpiece $W_R$.

The processor 40 serves as the shape data acquisition section 102 configured to acquire the image data ID from the vision sensor 16. Next, the processor 40 extracts feature points reflected in the image data ID by analyzing the image data ID, and specifies the work target portion image $ID_F$ reflected in the image data ID.

Next, the processor 40 transforms the coordinates of the sensor coordinate system C3 of the work target portion image $ID_F$ into the robot coordinate system C1 by using the above-described transformation matrices M1 and M2, and acquires data (specifically, coordinates) of a position $P_{FI}$ of the work target portion $F_R$ in the robot coordinate system C1. In this way, in the present embodiment, the processor 40 serves as a position acquisition section 104 (FIG. 2) configured to acquire the position $P_{FI}$ of the work target portion $F_R$ in the control coordinate system (robot coordinate system C1) based on the image data ID.

Figure 4:
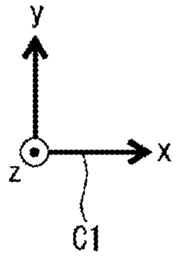
FIG. 4 is a diagram for explaining an error between a position of a work target portion acquired based on shape data and a position of a work target portion in a real space.

An error may occur between the position $P_{FI}$ of the work target portion $F_R$ acquired by the processor 40 based on the image data ID and the position of the work target portion $F_R$ on the workpiece $W_R$ installed in the real space. The error will be described with reference to FIG. 4. In FIG. 4, the dotted line schematically indicates the position of the actual workpiece $W_R$ in the robot coordinate system C1. In FIG. 4, the solid line $F_I$ indicates a work target portion $F_I$ at the position $P_{FI}$ acquired based on the image data ID in the robot coordinate system C1.

As illustrated in FIG. 4, an end $E_I$ of the work target portion $F_I$ acquired based on the image data ID and an end (that is, vertex) $E_R$ of the work target portion $F_R$ on the actual workpiece $W_R$ misalign from each other by an error δ. Such an error occurs due to the positioning accuracy when the robot 12 arranges the vision sensor 16 at an imaging position, the detection accuracy of the vision sensor 16, the resolution of the image data ID, a dimensional error between the actual workpiece $W_R$ and the workpiece model $W_M$, an error in the installation position of the workpiece $W_R$ in the real space, or the like.

Next, based on the acquired position $P_{FI}$, the processor 40 sets a plurality of target positions $TP_n$ at which the robot 12 is to be sequentially positioned (specifically, the tip point of the tool 34) for work on the workpiece $W_R$. Specifically, in the robot coordinate system C1, the processor 40 automatically sets the plurality of target positions $TP_n$(n=1, 2, 3, . . . , m−2, m−1, m) along the work target portion $F_I$ so as to correspond to the position $P_{FI}$ of the work target portion $F_I$ (e.g., so as to match the acquired position $P_{FI}$ or so as to be separated from the position $P_{FI}$ by a predetermined distance).

Figure 5:
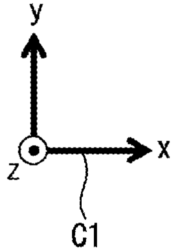
FIG. 5 is a diagram schematically illustrating an aspect in which a target position is set for a work target portion acquired based on shape data.

The target positions $TP_n$ set in this way are schematically illustrated in FIG. 5. In the robot coordinate system C1, the processor 40 sets, among the plurality of target positions $TP_n$, the final target position $TP_m$, at which the robot 12 is to be finally positioned during work, so as to correspond to the end $E_I$ of the work target portion $F_I$ (so as to match, or so as to be separated by a predetermined distance). In other words, the final target position $TP_m$ is set to correspond to the end $E_R$ of the work target portion $F_R$ (i.e., work target portion $ID_F$) in the image data ID.

In this way, in the present embodiment, the processor 40 serves as a target position setting section 106 (FIG. 2) configured to set the target positions $TP_n$ based on the shape data (drawing data DD and image data ID). The processor 40 stores, in the storage 42, position data (coordinates) of each of the set target positions $TP_n$ in the robot coordinate system C1.

When the processor 40 generates an operation program in which the target positions $TP_n$ set as described above are defined and causes the robot 12 to execute a work in accordance with the operation program, the processor 40 causes the robot 12 to end the work when the robot 12 reaches the final target position $TP_m$. In this case, since the final target position $TP_m$ misaligns from the vertex $E_R$ of the actual workpiece $W_R$ by an error δ, there is a possibility that a portion of the actual work target portion $F_R$ near the end $E_R$ is unworked.

In order to avoid such a situation, in the present embodiment, the processor 40 automatically sets an additional target position $TP_A$ at a position separated from the set final target position $TP_m$ by a predetermined distance Δ in a predetermined extension direction ED. Specifically, the processor 40 first sets the extension direction ED. As an example, the processor 40 specifies the extension direction of the work target portion image $ID_F$ in the vicinity of the end $E_R$ by analyzing the image data ID. The processor 40 sets the specified extension direction of the work target portion image $ID_F$ as the extension direction ED.

As another example, the processor 40 refers to the drawing data DD of the workpiece model $W_M$, and sets, as the extension direction ED, the extension direction of the edge model $F_M$ when the workpiece model $W_M$ is arranged at a known installation position in the robot coordinate system C1. In this way, in the case of these examples, the processor 40 sets the extension direction ED based on the shape data (image data ID and drawing data DD).

As yet another example, the processor 40 may set the extension direction ED based on the set final target position $TP_m$ and the target position $TP_n$ before the final target position $TP_m$($n<m$). For example, the processor 40 obtains a vector VDI from a target position $TP_{m-1}$ immediately before the final target position $TP_m$ to the final target position $TP_m$.

The processor 40 sets the direction of the vector VDI as the extension direction ED. In the case of this example, the processor 40 sets the extension direction ED based on the target position $TP_n$. In this way, in the present embodiment, the processor 40 serves as a direction setting section 108 (FIG. 2) configured to set the extension direction ED based on the shape data (image data ID and drawing data DD) or the target position $TP_n$.

Next, in the robot coordinate system C1, the processor 40 automatically sets the additional target position $TP_A$ at a position separated from the final target position $TP_m$ by the distance Δ in the set extension direction ED. The distance Δ is predetermined by the operator, and is stored in the storage 42. The processor 40 stores, in the storage 42, position data (coordinates) of the set additional target position $TP_A$ in the robot coordinate system C1. In this way, the processor 40 serves as an additional target position setting section 110 (FIG. 2) configured to set the additional target position $TP_A$.

Next, the processor 40 uses the position data of the plurality of target positions $TP_n$($n=1$ to m) and the position data of the additional target position $TP_A$, and generates the operation program OP in which the target positions $TP_n$ and the additional target position $TP_A$ are defined. The operation program OP is a computer program that causes the robot 12 to execute a series of operations for work.

In the operation program OP, the position data of the target positions $TP_n$ and the additional target position $TP_A$, an instruction statement for positioning to the target position $TP_n$, and data on the movement speed and movement path of the robot 12 (specifically, the tool 34) between two target positions $TP_n$ and $TP_{n+1}$ are defined. In this way, in the present embodiment, the processor 40 serves as a program generation section 112 (FIG. 2) configured to generate the operation program OP.

As described above, the processor 40 serves as the shape data acquisition section 102, the position acquisition section 104, the target position setting section 106, the direction setting section 108, the additional target position setting section 110, and the program generation section 112, and generates the operation program OP. Thus, the shape data acquisition section 102, the position acquisition section 104, the target position setting section 106, the direction setting section 108, the additional target position setting section 110, and the program generation section 112 constitute a device 100 (FIG. 2) configured to generate the operation program OP.

Figure 6:
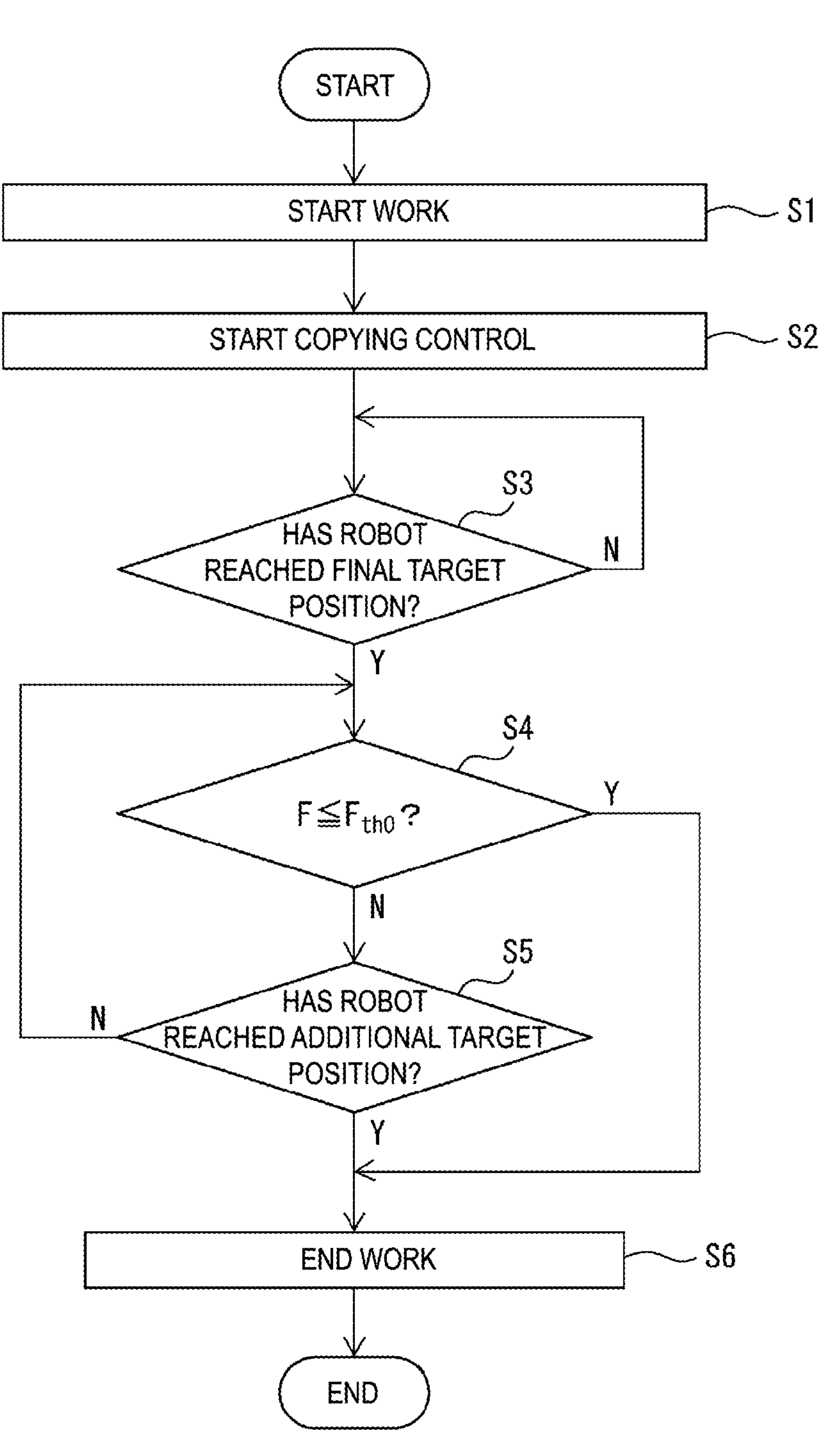
FIG. 6 is a flowchart illustrating an example of an operation flow executed by a control device illustrated in FIG. 2.

Next, an example of an operation flow executed by the control device 18 will be described with reference to FIG. 6. The flow illustrated in FIG. 6 starts when the processor 40 receives a work start command from the operator, a higher-level controller, or a computer program (for example, the above-described operation program OP).

In step S1, the processor 40 starts a work (deburring) on the workpiece $W_R$. Specifically, the processor 40 controls the robot 12 in accordance with the operation program OP, and rotationally drives the tool 34 by the tool driver 36, thereby staring an operation of positioning the tool 34 (or the origin of the tool coordinate system C2) in the order of target positions $TP_1$, $TP_2$, $TP_3$ . . . , $TP_m$ while pressing the tool 34 against the workpiece $W_R$. By so doing, the work of scraping the workpiece $W_R$ with the tool 34 along the work target portion $F_R$ and removing burrs is started. In this way, in the present embodiment, the processor 40 serves as a robot control section 52 (FIG. 2) configured to control the robot 12.

In step S2, the processor 40 starts copying control. Specifically, the processor 40 continuously acquires data of force F, which is continuously (for example, periodically) detected by the force sensor 14, from the force sensor 14. In this way, in the present embodiment, the processor 40 serves as a force acquisition section 54 (FIG. 2) configured to acquire the data of the force F.

Then, based on the acquired force F, the processor 40 controls a pressing force $F_p$, by which the robot 12 presses the tool 34 against the workpiece $W_R$, to a predetermined target value $F_T$. For example, the processor 40 determines whether or not the magnitude of the acquired force F is within a range [$F_{th1}$, $F_{th2}$] predetermined with the target value $F_T$ as a criterion ($F_{th1} \leq F \leq F_{th2}$). The threshold values $F_{th1}$ and $F_{th2}$ that define the range [$F_{th1}$, $F_{th2}$] are predetermined by the operator as values satisfying, for example, $F_{th1} \leq F_T \leq F_{th2}$, and are stored in the storage 42.

When $F_{th1} > F$, the processor 40 determines that the pressing force $F_p$ is excessively smaller than the target value $F_T$, and operates the robot 12 to displace the tool 34 in the direction toward the workpiece $W_R$ (e.g., the z-axis minus direction of the robot coordinate system C1), and increases the pressing force $F_p$ acting on the workpiece $W_R$.

Furthermore, when $F > F_{th2}$, the processor 40 determines that the pressing force $F_p$ is excessively larger than the target value $F_T$, and operates the robot 12 to displace the tool 34 in the direction away from the workpiece $W_R$ (e.g., the z-axis plus direction of the robot coordinate system C1), and decreases the pressing force $F_p$ acting on the workpiece $W_R$. By so doing, the processor 40 executes copying control for controlling the pressing force $F_p$ to the target value $F_T$.

In step S3, the processor 40 determines whether or not the robot 12 has reached the final target position $TP_m$. Specifically, the processor 40 receives position feedback $FB_T$ indicating the rotation position (or rotation angle) of the servomotor 35 from a rotation detector (encoder, Hall element, etc.) provided in each servomotor 35 of the robot 12.

Based on the position feedback $FB_T$ from each servomotor 35, the processor 40 can obtain a position $P_T$ of the tool 34 (or the origin of the tool coordinate system C2) in the robot coordinate system C1. In step S3, the processor 40 determines whether or not the obtained position $P_T$ of the tool 34 matches the final target position $TP_m$ (or is within the range determined with the final target position $TP_m$ as a criterion).

When it is determined that the position $P_T$ matches the final target position $TP_m$ (i.e., YES), the processor 40 proceeds to step S4, and when it is determined that the position $P_T$ has not reached the final target position $TP_m$ (i.e., NO), the processor 40 loops step S3. After determining YES in step S3, the processor 40 causes the robot 12 to continue the work by moving the tool 34 pressed against the workpiece W by the robot 12 toward the additional target position $TP_A$ beyond the final target position $TP_m$.

In step S4, the processor 40 determines whether or not the magnitude of the force F most recently acquired from the force sensor 14 is equal to or less than a threshold value $F_{th0}$. The threshold value $F_{th0}$ is predetermined by the operator as a value close to, for example, zero ($F_{th1}>F_{th0}=0$), and stored in the storage 42.

When it is determined that the force F is equal to or less than the threshold value $F_{th0}$ (i.e., YES), the processor 40 proceeds to step S6, and when it is determined that the force F is greater than the threshold value $F_{th0}$ (i.e., NO), the processor 40 proceeds to step S5. In this way, in the present embodiment, the processor 40 serves as a force determination section 56 (FIG. 2) configured to determine whether or not the force F is equal to or less than the threshold value $F_{th0}$ while the robot 12 continues the work beyond the final target position $TP_m$.

In step S5, the processor 40 determines whether or not the robot 12 has reached the additional target position $TP_A$. Specifically, the processor 40 determines whether or not the above-described position $P_T$ obtained from the position feedback $FB_T$ matches the additional target position $TP_A$ (or is within the range determined with the additional target position $TP_A$ as a criterion).

When it is determined that the position $P_T$ matches the additional target position $TP_A$ (i.e., YES), the processor 40 proceeds to step S6, and when it is determined that the position $P_T$ has not reached the additional target position $TP_A$ (i.e., NO), the processor 40 returns to step S4. By so doing, the processor 40 loops step S4 and S5 until YES is determined in step S4 or S5 and continues the work.

In step S6, the processor 40 ends the work. Specifically, the processor 40 moves the tool 34 by the robot 12 in a predetermined escape direction (e.g., the z-axis plus direction of the robot coordinate system C1) so as to be separated from the workpiece W, and stops the rotation of the tool 34 by stopping the operation of the tool driver 36. By so doing, the processor 40 ends the work on the workpiece W.

As described above, in the present embodiment, the processor 40 causes the robot 12 to continue the work beyond the final target position $TP_m$ after the robot 12 reaches the final target position $TP_m$. According to the configuration, even though the error δ as described above occurs, it is possible to complete the work up to the end $E_R$ of the work target portion $F_R$ and prevent a portion near the end $E_R$ from being unworked. This makes it possible to improve the finish quality of the workpiece W.

Furthermore, in the present embodiment, the processor 40 operates the robot 12 in accordance with the operation program OP in which the additional target position $TP_A$ is defined in addition to the target position $TP_n$, and causes the robot 12 to continue the work up to the additional target position $TP_A$. According to the configuration, the processor 40 can reliably and quickly complete a work up to the end $E_R$ of the work target portion $F_R$ by the robot 12.

Furthermore, in the present embodiment, it is determined in step S4 described above that the force F is equal to or less than the threshold value $F_{th0}$, and ends the work when YES is determined (step S6). Regarding this function, while the work is being executed from the final target position $TP_m$ to the additional target position $TP_A$, the tool 34 may exceed the end $E_R$ of the work target portion $F_R$ on the workpiece $W_R$ toward the x-axis plus direction of the robot coordinate system C1. In this case, since the tool 34 is separated from the workpiece $W_R$, the force F applied from the workpiece $W_R$ to the tool 34 is sharply reduced.

According to the present embodiment, the fact that the tool 34 has exceeded the end $E_R$ is detected by monitoring the force F, and a work is ended when it is highly probable that the tool 34 has exceeded the end $E_R$ (i.e., when YES is determined in step S4), and the robot 12 is retracted. In this way, it is possible to reduce the possibility that the robot 12 moves beyond the end $E_R$ and interferes with environmental objects around the robot 12 and to quickly end the work, so that the work cycle time can be reduced.

Furthermore, in the present embodiment, the processor 40 takes on the functions of the device 100 including shape data acquisition section 102, the target position setting section 106, the additional target position setting section 110, and the program generation section 112, and generates the operation program OP. According to the device 100, the operation program OP in which the target position $TP_n$ and the additional target position $TP_A$ are defined can be automatically generated from the shape data (drawing data DD and image data ID).

Furthermore, in the present embodiment, the device 100 further includes the position acquisition section 104 configured to acquire the position $P_{FI}$ of the work target portion $F_R$ in the control coordinate system (robot coordinate system C1) based on the image data ID, and sets the plurality of target positions $TP_n$ based on the acquired position $P_{FI}$. According to the configuration, the plurality of target positions $TP_n$ can be set to correspond, with some accuracy, to the work target portion $F_R$ on the workpiece $W_R$ actually installed in the control coordinate system (robot coordinate system C1), which makes it possible to prevent the above error δ from becoming excessive.

Furthermore, in the present embodiment, the device 100 further includes the direction setting section 108 configured to set the extension direction ED based on the shape data (drawing data DD and image data ID) or the target position $TP_n$. According to the configuration, the extension direction ED of a work can be set to be substantially along the extension direction of the work target portion $F_R$, so that the work can be accurately continued up to the end $E_R$ along the work target portion $F_R$.

Figure 7:
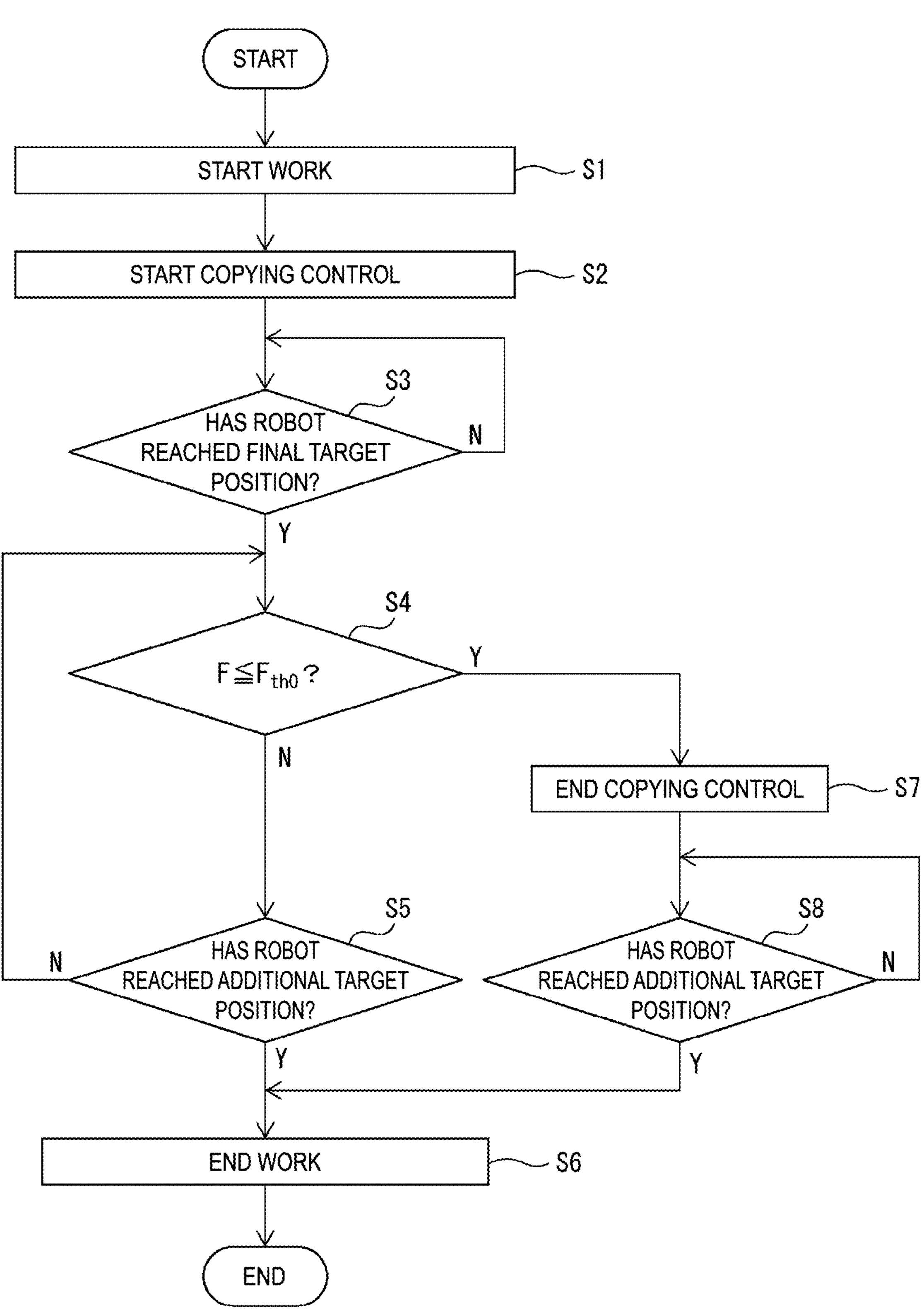
FIG. 7 is a flowchart illustrating another example of an operation flow executed by the control device illustrated in FIG. 2.

Next, another example of the operation flow executed by the control device 18 will be described with reference to FIG. 7. The flow illustrated in FIG. 7 differs from the flow illustrated in FIG. 6 in that steps S7 and S8 are further provided. Specifically, when YES is determined in step S4, the processor 40 ends the copying control, which is started in step S2 described above, in in step S7. As a result, the processor 40 moves the tool 34 toward the additional target position $T_A$ without advancing or retreating the tool 34 with respect to the workpiece $W_R$ (for example, displacement in the z-axis direction of the robot coordinate system C1).

In step S8, in the same manner as in step S5 described above, the processor 40 determines whether or not the robot 12 has reached the additional target position $TP_A$, proceeds to step S6 when YES is determined, and loops step S8 when NO is determined. In this way, according to the present embodiment, when the force F is equal to or less than the threshold value $F_{th0}$ while the robot 12 continues the work beyond the final target position $TP_m$ (i.e., the tool 34 exceeds the end $E_R$), the copying control is ended. With this, it is possible to prevent the processor 40 from executing unnecessary copying control, thereby reducing the amount of calculation of the processor 40 and reducing the possibility that the robot 12 interferes with surrounding environmental objects.

Next, other functions of the control device 18 will be described with reference to FIG. 8. In the present embodiment, the control device 18 has functions of a movement amount acquisition section 58 and a movement determination section 60 instead of the above-described force determination section 56. Hereinafter, an example of an operation flow executed by the control device 18 illustrated in FIG. 8 will be described with reference to FIG. 9. In the flow illustrated in FIG. 9, the same process as the flow illustrated in FIG. 6 is denoted by the same step number and redundant description thereof will be omitted.

Figure 9:
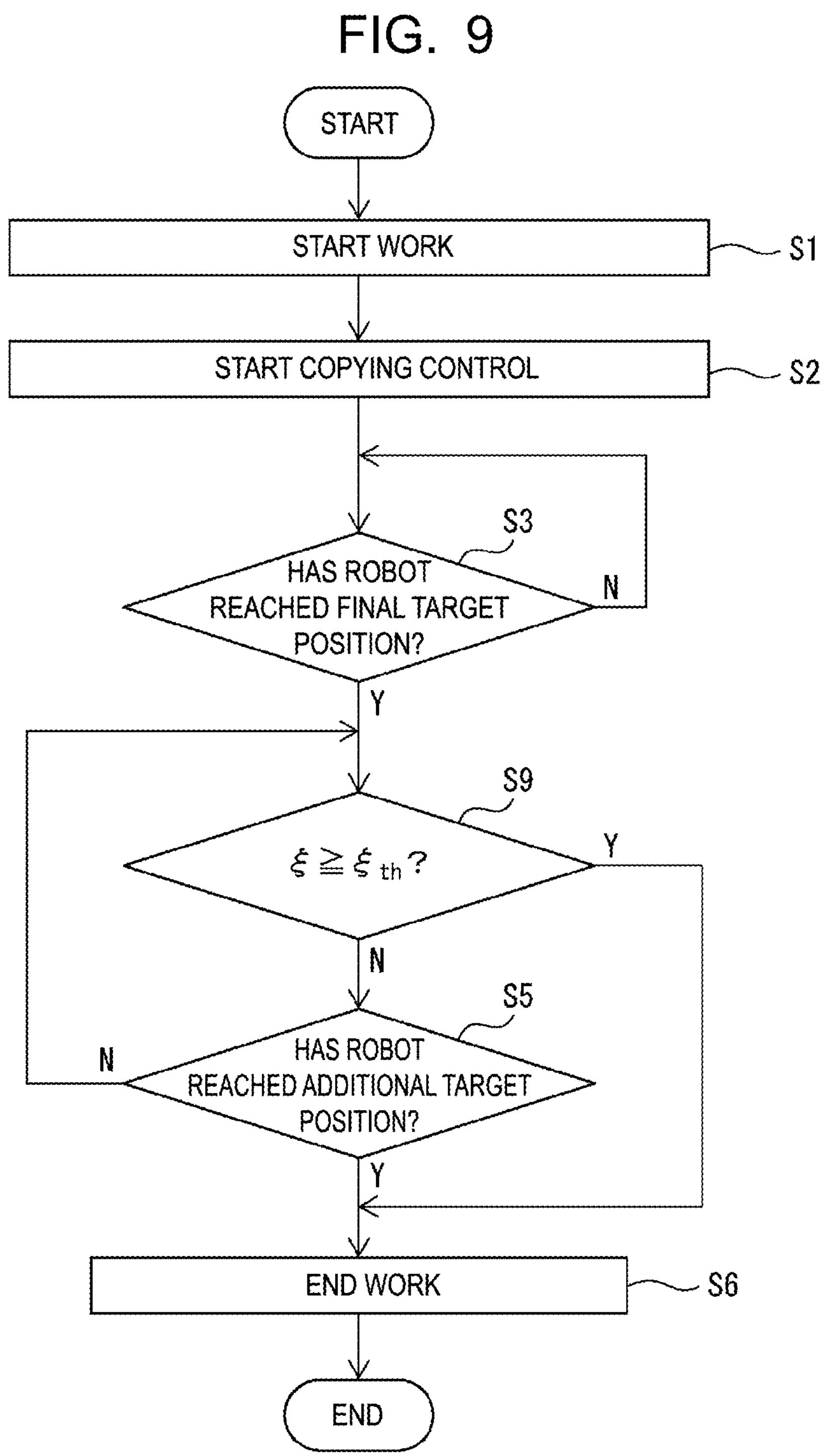
FIG. 9 is a flowchart illustrating an example of an operation flow executed by a control device illustrated in FIG. 8.

After the flow illustrated in FIG. 9 is started, the processor 40 executes step S1 to step S3 described above. In the present embodiment, after determining YES in step S3, the processor 40 continuously (for example, periodically) acquires the movement amount $\xi$ of the robot 12 (Specifically, the tool 34) in the direction PD (e.g., the z-axis minus direction of the robot coordinate system C1) in which the tool 34 is pressed against the workpiece $W_R$.

Specifically, the processor 40 continuously acquires the above-described position $P_T$ based on the position feedback $FB_T$ from each servomotor 35, and obtains the movement amount $\xi$ of the robot 12 (end effector 28) from the position $P_T$ to the direction PD. By so doing, the processor 40 acquires the movement amount $\xi$ while the robot 12 executes the work, and stores the movement amount $\xi$ in the storage 42. Consequently, the processor 40 serves as the movement amount acquisition section 58 (FIG. 8) configured to acquire the movement amount $\xi$. The processor 40 may start an operation of acquiring the movement amount $\xi$ when the work is started in step S1.

In step S9, the processor 40 determines whether or not the most recently acquired movement amount $\xi$ exceeds a predetermined threshold value $\xi_{th}$. The threshold value $\xi_{th}$ is predetermined by the operator and stored in the storage 42. The processor 40 determines YES when the movement amount $\xi$ exceeds the threshold value $\xi_{th}(\xi>\xi_{th})$ and proceeds to step S6, and determines NO when the movement amount $\xi$ does not exceed the threshold value $\xi_{th}(\xi<\xi_{th})$ and proceeds to step S5. In this way, the processor 40 serves as the movement determination section 60 (FIG. 8) configured to determine whether or not the movement amount & exceeds the threshold value $\xi_{th}$ while the robot 12 continues the work beyond the final target position $TP_m$.

As described above, in the present embodiment, the processor 40 causes the robot 12 to end the work when it is determined in step S9 described above that the movement amount & exceeds the threshold value $\xi_{th}$ (step S6). Regarding this function, while the work is being executed from the final target position $TP_m$ to the additional target position $TP_A$, when the tool 34 exceeds the end $E_R$, the tool 34 is sharply displaced in the direction PD (for example, the z-axis minus direction of the robot coordinate system C1), thereby the movement amount $\xi$ in the direction PD increases.

According to the present embodiment, the fact that the tool 34 has exceeded the end $E_R$ is detected by monitoring the movement amount $\xi$, and the work is ended when it is highly probable that the tool 34 has exceeded the end $E_R$ (i.e., when YES is determined in step S9), and the robot 12 is retracted. In this way, it is possible to reduce the possibility that the robot 12 moves beyond the end $E_R$ and interferes with environmental objects around the robot 12 and to quickly end the work, so that the work cycle time can be reduced.

Figure 10:
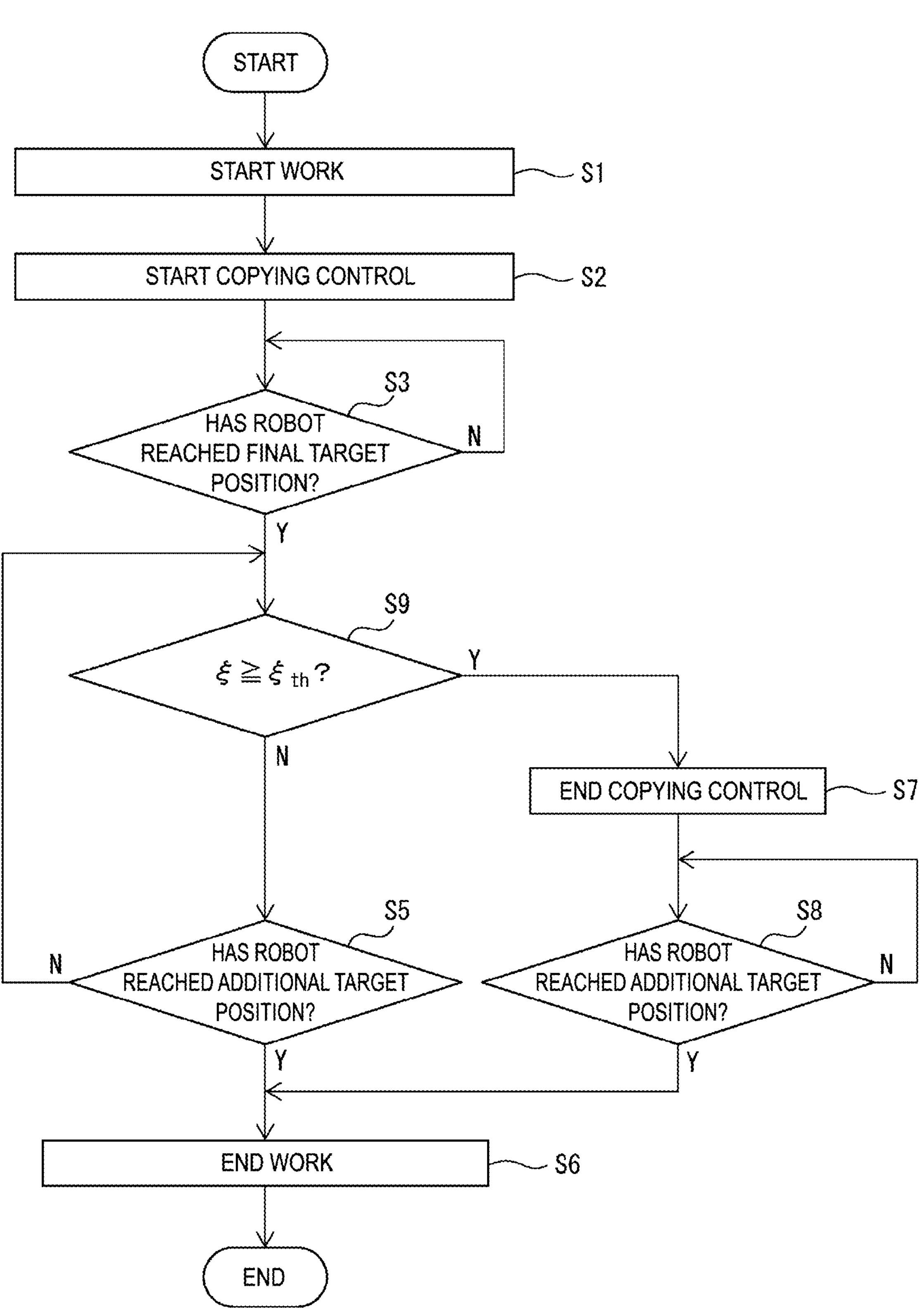
FIG. 10 is a flowchart illustrating another example of an operation flow executed by the control device illustrated in FIG. 8.

Next, another example of the operation flow executed by the control device 18 illustrated in FIG. 8 will be described with reference to FIG. 10. The flow illustrated in FIG. 10 differs from the flow illustrated in FIG. 9 in that steps S7 and S8 are further provided. Specifically, when YES is determined in step S9, the processor 40 ends the copying control by executing step S7 described above, and then executes step S8. According to the present embodiment, it is possible to prevent the processor 40 from executing unnecessary copying control, thereby reducing the amount of calculation of the processor 40 and reducing the possibility that the robot 12 interferes with surrounding environmental objects.

Figure 8:
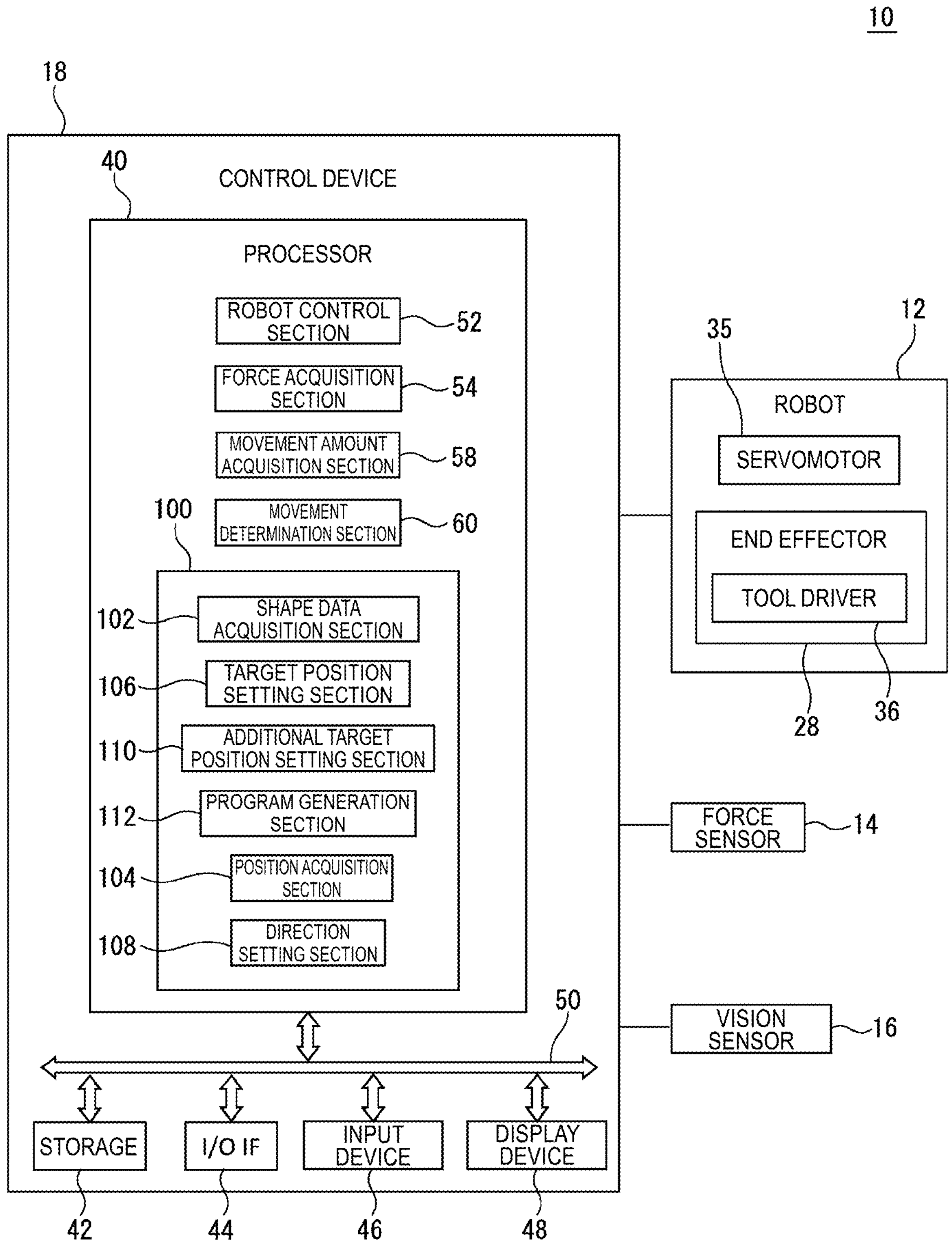
FIG. 8 is a block diagram of a robot system according to another embodiment.

In the embodiment illustrated in FIG. 8, the processor 40 may acquire the speed or acceleration of the robot 12 (end effector 28) in the direction PD instead of (or in addition to) the movement amount $\xi$. Then, in step S9, the processor 40 may determine whether or not the acquired speed or acceleration exceeds a predetermined threshold value. When the tool 34 exceeds the end $E_R$, the speed or acceleration of the robot 12 also increases, and thus it is possible to detect that the tool 34 exceeds the end $E_R$ by monitoring the speed or acceleration.

In the above-described embodiments, the case where, in step S1, the processor 40 executes the work in accordance with the operation program OP in which the target position $TP_n$ and the additional target position $TP_A$ are defined has been described. However, the present disclosure is not limited thereto, and the processor 40 may execute the work in accordance with an operation program OP' in which the additional target position $TP_A$ is not defined.

Figure 11:
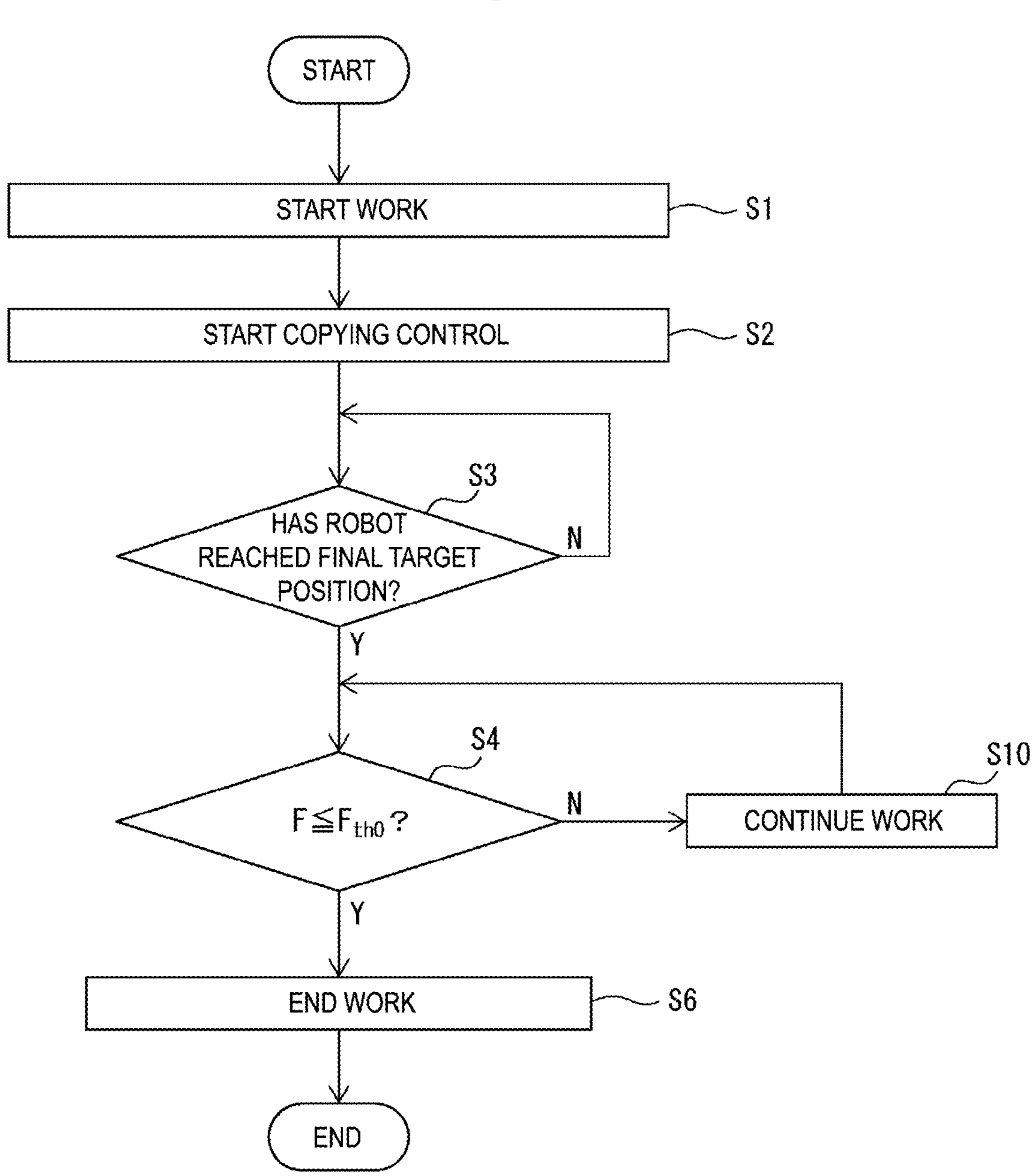
FIG. 11 is a flowchart illustrating further another example of an operation flow executed by the control device.

An example of such an operation flow is illustrated in FIG. 11. For example, the processor 40 of the control device 18 illustrated in FIG. 2 executes the flow illustrated in FIG. 11. In the flow illustrated in FIG. 11, the same process as the flow illustrated in FIG. 6 is denoted by the same step number and redundant description thereof will be omitted.

In step S1, the processor 40 starts a work by controlling the robot 12 in accordance with the operation program OP'. In the operation program OP', the plurality of target positions $TP_n$(n=1, 2, 3, . . . , m−2, m−1, m) are defined but the above-described additional target position $TP_A$ is not defined. Thereafter, the processor 40 executes steps S2 to S4.

When NO is determined in step S4, the processor 40 causes the robot 12 to continue the work in step S10. Specifically, the processor 40 first determines the extension direction ED. As an example, the processor 40 obtains the movement direction of the robot 12 (tool 34) at the time when YES is determined in step S3 described above (or when NO is determined in step S4).

For example, the processor 40 can acquire the movement direction based on the above-described position $P_T$ obtained from the position feedback $FB_T$. The processor 40 determines the required movement direction as the extension direction ED. Alternatively, the processor 40 may determine the extension direction ED based on the shape data (image data ID and drawing data DD) or the target position $TP_n$, similarly to the above-described direction setting section 108.

Then, the processor 40 moves the robot 12 in the determined extension direction ED and continues the rotation of the tool 34 by the tool driver 36, thereby causing the robot 12 to continue the work on the workpiece $W_R$. Then, the processor 40 returns to step S4. Even though the robot 12 has reached the final target position $TP_m$, when the force F applied from the workpiece $W_R$ to the tool 34 at this time is greater than the threshold value $F_{th0}$ ($F>F_{th0}$), there is a possibility that the tool 34 does not exceed the end $E_R$ and a portion of the work target portion $F_R$ near the end $E_R$ is unworked.

In the present embodiment, it is determined whether to continue the work based on the magnitude of the force F at the time when the robot 12 has reached the final target position $TP_m$ (i.e., when YES is determined in step S3). According to the configuration, even though the work is executed in accordance with the operation program OP' in which the additional target position $TP_A$ is not defined, the work can be reliably completed up to the end $E_R$.

Figure 12:
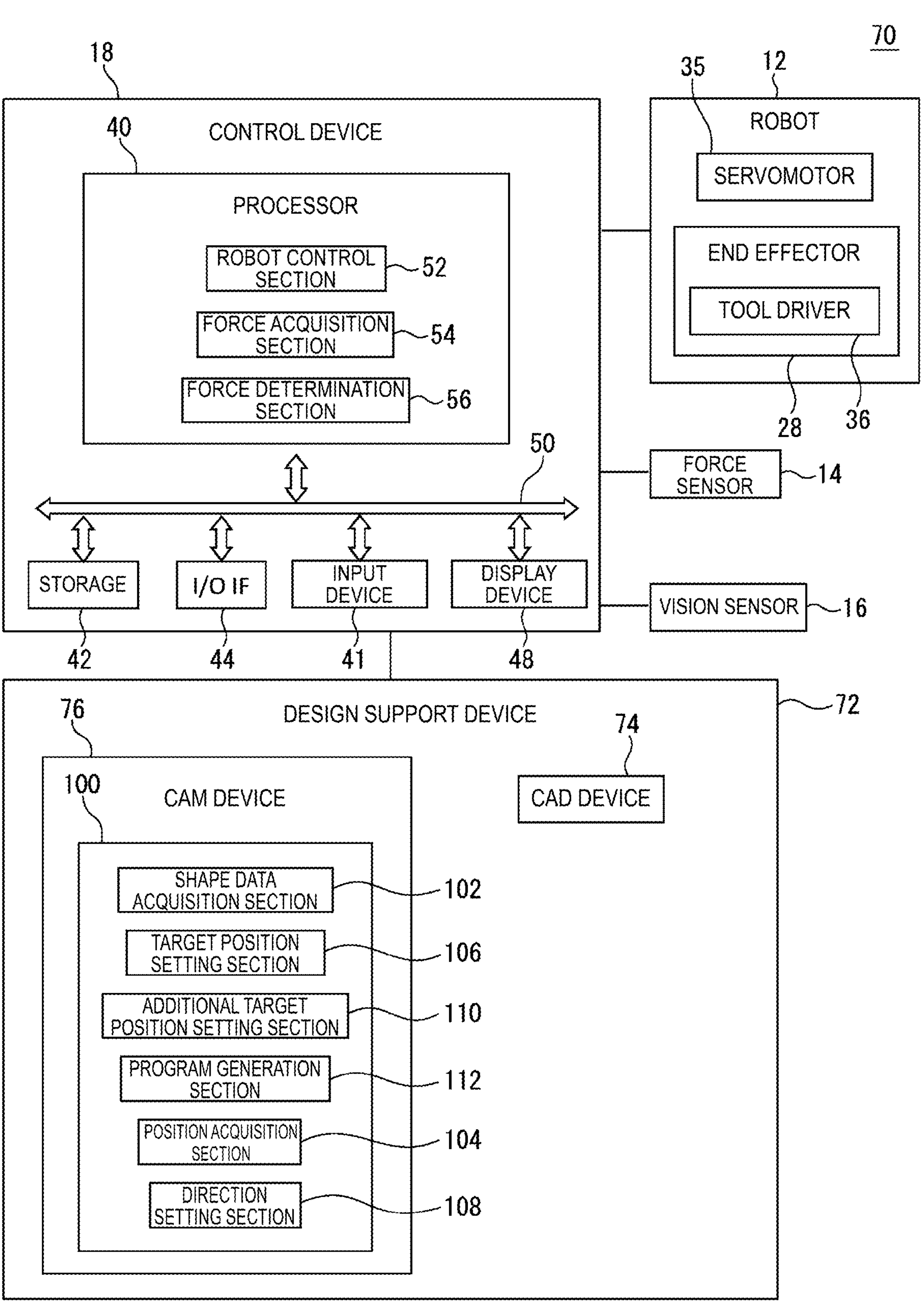
FIG. 12 is a block diagram of a robot system according to another embodiment.

In the above-described embodiments, the case where the device 100 is implemented in the control device 18 as a function executed by the processor 40 has been described. However, the present disclosure is not limited thereto, and the device 100 may be provided outside the control device 18. Such an aspect is illustrated in FIG. 12. A robot system 70 illustrated in FIG. 12 includes a design support device 72 in addition to the robot 12, the force sensor 14, the vision sensor 16, and the control device 18 described above.

The design support device 72 includes a CAD device 74 and a CAM device 76. The CAD device 74 is a drawing device that receives an operation by the operator and generates the drawing data DD of the workpiece model $W_M$. The CAM device 76 is a device that generates a computer program based on the drawing data (3D CAD data).

In the present embodiment, the device 100 is implemented in the CAM device 76. The CAM device 76 receives the drawing data DD from the CAD device 74, and generate the operation program OP by serving as the shape data acquisition section 102, the position acquisition section 104, the target position setting section 106, the direction setting section 108, the additional target position setting section 110, and the program generation section 112.

The design support device 72 is communicably connected to the I/O interface 44 of the control device 18, acquires the position data of the robot 12, the image data ID imaged by the vision sensor 16, or the like from the control device 18, and transmits the generated operation program OP to the control device 18. The CAD device 74 and the CAM device 76 may be separate computers each including a processor (CPU, GPU, etc.) and a storage (ROM, RAM), or may be configured as one computer including a common processor and storage.

In the above-described embodiments, the case where the processor 40 sets the target position $TP_n$ based on the image data ID as the shape data has been described. However, the present disclosure is not limited thereto, and the processor 40 can also set the target position $TP_n$ based on the drawing data DD as the shape data.

For example, based on the above-described position $PF_{FM}$ acquired from the workpiece model $W_M$, the processor 40 may set the target position $TP_n$ in the robot coordinate system C1 so as to correspond to the position $PF_{FM}$ (e.g., so as to match, or so as to be separated by a predetermined distance). In this case, the vision sensor 16 can be omitted from the robot systems 10 and 70.

Furthermore, in the above-described embodiments, the case where the force sensor 14 is interposed between the wrist 26 and the end effector 28 has been described, but the force sensor 14 may also be installed at any part of the robot 12 (for example, the robot base 20, the lower arm 30, and the upper arm 32). Furthermore, the force sensor 14 is not limited to a 6-axis force sensor, and may include, for example, a plurality of torque sensors that are provided on each servomotor 35 and detects a torque applied to the servomotor 35. The processor 40 can acquire torque (force) data from the plurality of torque sensors and obtain the force F applied to the tool 34 from the workpiece $W_R$ based on the torque.

Furthermore, the force sensor 14 can also be omitted from the robot systems 10 and 70. For example, the processor 40 can also serve as the force acquisition section 54 and acquire a current feedback (disturbance torque) $FB_C$ from each servomotor 35, and thus acquire the force F based on the current feedback $FB_C$.

Furthermore, the force acquisition section 54 and the force determination section 56 can also be omitted from the control device 18 illustrated in FIG. 2. In this case, steps S2 and S4 are omitted from the flow illustrated in FIG. 6. Similarly, the force acquisition section 54, the movement amount acquisition section 58, and the movement determination section 60 can also be omitted from the control device 18 illustrated in FIG. 8. In this case, steps S2 and S9 are omitted from the flow illustrated in FIG. 9.

Furthermore, the position acquisition section 104 can also be omitted from the above-described device 100. For example, as described above, the processor 40 can also set the target position $TP_n$ based on the drawing data DD. In this case, the process of acquiring the position $P_{FI}$ of the work target portion $F_R$ in the control coordinate system from the image data ID can be omitted.

Furthermore, the direction setting section 108 can also be omitted from the device 100. For example, when the work target portion $F_R$ is arranged to extend in parallel to the x-axis of the robot coordinate system C1 as in the above-described embodiment (in other words, the extension direction of the work target portion $F_R$ is known), the extension direction ED may be predetermined by the operator as the x-axis plus direction (known extension direction) of the robot coordinate system C1. In this case, the process of setting the extension direction ED based on the shape data or the target position $TP_n$ can be omitted.

Furthermore, in the device 100, the additional target position setting section 110 may also change the above-mentioned distance Δ according to predetermined work conditions. This work conditions include, for example, the movement speed and movement path of the robot 12 (specifically, the tool 34), the specifications of the workpiece $W_R$ (dimensions, shapes, materials, etc.), and the specifications of the vision sensor 16 (resolution of the image data ID, the size of an imaging sensor, etc.).

As an example, the processor 40 may also change the distance Δ according to the resolution such that the lower the resolution of the image data ID, the larger the distance Δ. Since the above-mentioned error δ may be large as the resolution of the image data ID is low, it is possible to more reliably avoid the occurrence of an unworked portion at the work target portion $F_R$ by increasing the distance Δ according to a decrease in the resolution.

As another example, the processor 40 may also change the distance Δ according to the movement speed such that the distance Δ is reduced as the movement speed of the robot 12 increases. When the movement speed is high, the movement distance of the robot 12 tends to increase, then it is possible to reduce the possibility that the tool 34 continues a work beyond the end $E_R$ by reducing the distance Δ according to the magnitude of the movement speed.

Furthermore, the above-described control coordinate system is not limited to the robot coordinate system C1 and the tool coordinate system C2, and for example, a world coordinate system or a workpiece coordinate system may be set. The world coordinate system is a coordinate system that defines a three-dimensional space of a work cell of the robot 12, and the robot coordinate system C1 is fixed in the world coordinate system. Furthermore, the workpiece coordinate system is a coordinate system that defines the position and orientation of the workpiece $W_R$ in the robot coordinate system C1 (or the world coordinate system).

Furthermore, in the above-described embodiments, the case where the robot 12 executes deburring on the workpiece $W_R$ has been described, but the concept of the present disclosure can also be applied to any application in which the robot 12 is positioned at the plurality of target positions $TP_n$ and caused to execute a work. For example, the robot 12 may be one that polishes a surface of the workpiece $W_R$, may be one that performs laser processing (laser cutting, laser welding) on the workpiece $W_R$, or may be one that performs coating on a surface of the workpiece $W_R$. Although the present disclosure is described above through the embodiments, the above-described embodiments do not limit the invention according to the claims.

The invention claimed is:

1. A device configured to generate an operation program of a robot, the device comprising:

a processor configured to acquire shape data representing a shape of a workpiece;

set a plurality of target positions at which the robot is to be sequentially positioned for a work onto a work target portion on the workpiece, based on the shape data;

automatically set an additional target position at a position separated from a final target position of the plurality of target positions by a predetermined distance in a predetermined extension direction, the final target position being set to correspond to an end of the work target portion in the shape data; and generate the operation program in which the plurality of target positions and the additional target position are defined, wherein the robot is controlled in accordance with the generated operation program to execute the work.

2. The device of claim 1, wherein the processor is configured to acquire, as the shape data, image data of the workpiece imaged by a vision sensor arranged in a known positional relationship with a control coordinate system for controlling the robot, the processor is configured to further acquire a position of the work target portion in the control coordinate system based on the image data, and the processor is configured to set the plurality of target positions based on the position of the work target portion.

3. The device of claim 1, wherein the processor is further configured to set the extension direction based on the shape data or the target position.

4. A method of generating an operation program of a robot, the method comprising:

acquiring shape data representing a shape of a workpiece;

setting a plurality of target positions at which the robot is to be sequentially positioned for a work onto a work target portion on the workpiece, based on the shape data;

automatically setting an additional target position at a position separated from a final target position of the plurality of target positions by a predetermined distance in a predetermined extension direction, the final target position being set to correspond to an end of the work target portion in the shape data; and generating the operation program in which the plurality of target positions and the additional target position are defined, wherein the robot is controlled in accordance with the generated operation program to execute the work.

* * * * *